United States Patent [19]

Raybould et al.

[11] Patent Number: 4,942,322

[45] Date of Patent: Jul. 17, 1990

[54] PERMANENT MAGNET ROTOR WITH BONDED SHEATH

[75] Inventors: Derek Raybould, Denville; Gordon E. Fish, Verona, both of N.J.; Joseph Denk, Manhattan Beach, Calif.

[73] Assignee: Allied-Signal Inc., Morris Township, Morris County, N.J.

[21] Appl. No.: 199,632

[22] Filed: May 27, 1988

[51] Int. Cl.⁵ .......................... H02K 1/06; B22F 7/00
[52] U.S. Cl. ....................................... 310/156; 29/598; 310/44; 419/8
[58] Field of Search .................. 29/598; 310/42, 156, 310/261, 265, 266, 44, 271; 419/8, 9; 75/3, 4, 5

[56] References Cited

U.S. PATENT DOCUMENTS

| | | | |
|---|---|---|---|
| 4,076,561 | 2/1978 | Lee et al. | 148/105 |
| 4,325,757 | 4/1982 | Jandeska, Jr. et al. | 419/8 |
| 4,533,891 | 8/1985 | Vanderlaan et al. | 310/80 |
| 4,667,123 | 5/1987 | Denk et al. | 310/156 |

*Primary Examiner*—Patrick R. Salce
*Assistant Examiner*—D. L. Rebsch
*Attorney, Agent, or Firm*—Ernest D. Buff; Gerhard H. Fuchs

[57] ABSTRACT

A rotor assembly comprises a high energy product permanent magnet contained within a sheath and metallurgically bonded thereto. The metallurgical bond imparts mechanical strength to the magnet, thereby preventing crack propagation therewithin during operation of the rotor assembly, and minimizes the thermal barrier to the transfer of heat from the magnet to the sheath.

8 Claims, 6 Drawing Sheets

Interface Inconel SmCo

PERMANENT MAGNET ROTOR WITH BONDED SHEATH

BACKGROUND OF THE INVENTION

This invention relates to a method for forming a permanent magnet rotor assembly, and, more particularly, to a method for forming a two pole permanent magnet rotor assembly wherein the permanent magnet material is contained within, and metallurgically bonded to, a nonmagnetic sheath.

DESCRIPTION OF THE PRIOR ART

It has been known in the art for some time that direct current electric motors employing permanent magnet rotors afford significant advantages over motors employing wound field designs, i.e., designs in which a magnetic field is supplied by the passage of electric current through windings disposed around a soft magnetic core. For example, less waste heat is produced by permanent magnet design electric motors, since there is no production of Joule heating in the windings. In addition, with permanent magnet motors, there is no need for slip rings or complex motor constructions (e.g. rotating rectifier designs, etc) to provide electrical power to a rotating shaft. Small permanent magnet motors are generally more efficient and compact, producing more power per unit weight than comparable wound field motors.

However, the processes for fabricating permanent magnet rotor assemblies are difficult, expensive, and low in yield. The most advantageous permanent magnet materials are those with highest energy products. The best presently known materials are rare-earth transition metal-based materials. Such materials have high hardness, low ductility, and low fracture toughness. They are processed by powder metallurgical techniques which do not allow a material to be formed directly into a shape with close control of finished dimensions. Hence, they must be machined to final form by grinding or other such machining processes which are difficult, time consuming and expensive. Because of the poor mechanical properties of the permanent magnet itself, the rotor assembly must include a support structure to which the magnet and shaft members are attached.

There remains, therefore, a great need in the art for techniques for efficiently forming permanent magnet rotor assemblies using high energy product magnet materials.

A publication entitled "Processing and Physical Metallurgy of NdFeB and other R.E. Magnets", by J. Ormerod, in *Nd-Fe Permanent Magnets: Their Present and Future Applications* (Elsevier 1985), discloses representative rare earth transition metal base magnet alloys and techniques used for processing these alloys into finished magnets. No disclosure is provided therein of a technique to produce magnets metallurgically bonded to a carrier structure.

One method of forming a high energy product, magnetically anisotropic permanent magnet is disclosed in European Patent Application No. 0 133 758. The magnet is formed by hot-working an iron-rare earth based metal alloy to densify the material and to cause it to undergo plastic deformation. No disclosure is made, however, of any process by which the final size of the magnet may be controlled with any precision, or of any process by which the magnet may be affixed to a supporting structure.

A variety of disclosures are known for methods of forming so-called bonded magnets to a desired shape. Such magnets are not sintered, but rather are molded prior to use thereof. Bonded magnets comprise particles of permanent magnet material dispersed in a low melting point, non-magnetic binder, which binder may be either a polymeric material or a metal or metal alloy such as solder. Generally, the amount of binder present comprises at least 10 percent by volume of the finished magnet structure. The energy product of such a bonded magnet is generally quite low, the energy product being at most the energy product of the parent magnetic material times the volume fraction of actual magnetic material.

U.S. Pat. No. 4,076,561, issued Feb. 28, 1978, discloses a method of making a laminated rare earth metal-cobalt permanent magnet body in which a layer of iron powder and at least one layer of rare earth-cobalt alloy powder are pressed together in a die to form a green compact and the green compact is sintered to form the laminated body. The method is directed to the formation of thin sheet-like sections of rare earth-cobalt permanent magnets. No disclosure is provided therein of a permanent magnet contained within a sheath or of any method of overcoming the propensity of rare earth transition metal green compacts to crack during sintering because of shrinkage due to densification.

U.S. Pat. No. 4,667,123, issued May 19, 1987, discloses a two pole permanent magnet rotor having a cylindrical two pole permanent magnet mounted between two end pieces and surrounded by a metal retaining hoop. The methods disclosed therein for placing the magnet within the retaining hoop include shrinking the hoop onto the magnet and expanding the hoop hydrostatically. The permanent magnet cannot be properly sized to the sheath prior to heat shrinking without a machining operation (e.g. grinding or electric discharge machining) which, owing to the brittle nature of the magnet, is difficult and expensive.

SUMMARY OF THE INVENTION

The present invention provides a permanent magnet rotor assembly and a method of fabrication thereof. The permanent magnet rotor assembly comprises a permanent magnet metallurgically bonded to a sheath and shaft members attached thereto. The rotor assembly is fabricated by a method comprising the steps of: (a) compacting a metal based magnet powder within a sheath to produce a cold compact; and (b) sintering the cold compact at a temperature and for a time sufficient to sinter the metal based magnet powder to a density of at least about 90% of the theoretical density and to bond the magnet material metallurgically to the sheath. The permanent magnet rotor assembly is suited for use in rotating electrical machines such as motors and generators, especially those operating at high speed.

The permanent magnet rotor assembly of the invention can be produced inexpensively and with higher yield than rotor assemblies produced by heat shrinking a metal sheath around a permanent magnet. Machining operations heretofore required to size the permanent magnet to the sheath are eliminated. The metallurgical bond between the magnet and the metal sheath of the rotor assembly advantageously imparts mechanical strength to the magnet, thereby preventing crack propagation therewithin during operation of the rotor assembly and minimizes the thermal barrier to the transfer of heat from the magnet to the sheath, from which the heat may be removed by air flow or other cooling means.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

Figure 1:
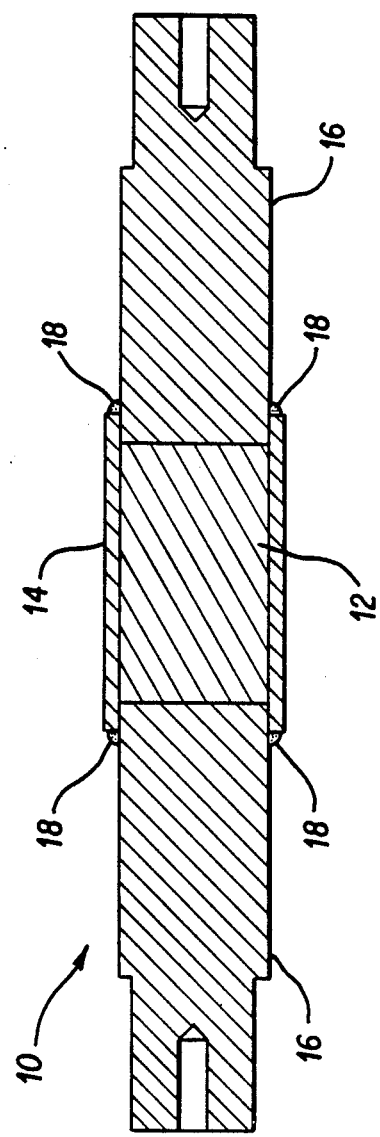
FIG. 1 is a cross-section of a permanent magnet rotor assembly of the present invention.
Figure 2:
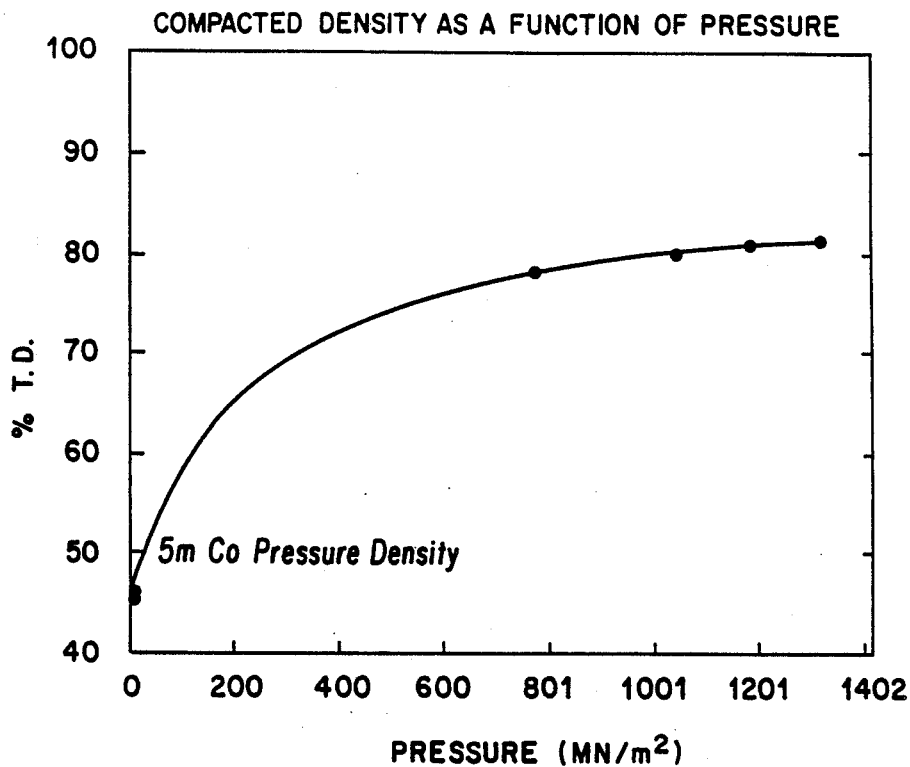
FIG. 2 is a graph showing variation in density of a cold compact as a function of applied pressure.

In accordance with the invention, there is provided a permanent magnet rotor assembly and a method of fabrication thereof. The permanent magnet rotor assembly is appointed for use in rotating electrical machines such as motors and generators.

The conventional processing of rare earth-transition metal based permanent magnets comprises the cold compaction of powder of the magnet material to form a green compact and sintering the green compact to form a dense body. Because the green compact has a density of at most about 70% of theoretical, the conventional sintering operation results in substantial shrinkage of the work-piece. The shrinkage in linear dimension is often about 10%. Hence, it is generally not possible to maintain any precise control of the size and shape of the finished magnet. In order to attach the magnet to a carrier, the magnet must be sintered oversized and finish machined to the required shape to be accommodated in the carrier. Such machining limits the shape of the magnet to a cylinder, due to cost considerations. These problems are avoided by the process of the invention, by way of which any shape of magnet may be readily constructed in an economical manner.

For many applications in rotating electrical machinery, the strength and toughness of the permanent magnet requires that the magnet be contained within such a carrier which provides sufficient mechanical integrity for the rotor assembly. Such integrity is especially important for high-speed machinery in which the rotor is subject to high radial loading.

The rotor assembly comprises a sheath, or shell, with a magnet contained therein. In the embodiments described hereinafter, the sheath or shell is cylindrical and houses a cylindrical magnet. Shaft members may then be connected to the ends of the cylindrical shell by conventional welding processes such as fillet welding, electron beam welding, inertia welding or by suitable techniques known in the art. The cylindrical shell should be composed of a non-magnetic material having sufficient mechanical strength and modulus. Representation of such materials are those selected from the group consisting of ceramics such as alumina, zirconia and other advanced ceramics, non-magnetic metal alloys such as superalloys, non-magnetic stainless steels, maraging steels, molybdenum and other materials capable of withstanding the sintering temperatures employed. A preferred material for the shell for high strength applications is an Inconel alloy such as Inconel 718. Inconel is a Trademark of International Nickel Corporation. The conventional construction of such a rotor assembly requires that the magnet be formed as a cylinder whose diameter precisely matches the inside diameter of the sheath within which the magnet is held, for example, by shrink fitting.

The inventors have discovered quite surprisingly, that it is possible to form such a rotor assembly in a direct process not requiring an intermediate machining of the magnet and in which a metallurgical bond is formed between the magnet and the sheath. A metallurgical bond is advantageous because it imparts mechanical strength to retain the magnet within the sheath and it minimizes the thermal barrier to transfer of heat from the magnet to the sheath, from which the heat may be removed by air flow or other cooling means. Such heat is inevitably generated in the magnet during operation of the rotor assembly in an electrical machine. The process of the invention allows the magnet to be pressed into complex shapes, such as square and rectangular shapes and shapes which vary along the length of the magnetic compact. In addition, the arrangement of the magnet within the sheath desirably imparts protection against mechanical and environmental damage.

Such a rotor assembly may be formed by a process comprising the steps of: (a) compacting a metal based magnet powder within a non-magnetic sheath to produce a cold compact; and (b) sintering the cold compact at a temperature and for a time sufficient to sinter the metal based magnet powder to a density of at least about 90% of the theoretical density and to bond the magnet powder metallurgically to the sheath.

FIG. 1 shows in cross section a preferred embodiment of the invention. A permanent magnet rotor assembly 10 is shown generally. A permanent magnet 12 is contained within a non-magnetic metal sheath or carrier 14 to which are attached shaft members 16. The shaft members 16 are attached to metal sheath 14 by welds 18.

In order to improve the bonding between magnet powder and sheath, it is preferred that a sintering pressure be applied to the magnet powder during the sintering step. This pressure is preferably a uniaxial pressure of about 0.05–0.2 MN m$^{-2}$, which pressure may conveniently be applied by a small weight having a diameter approximately that of the inner diameter of the sheath 14. As the sintering temperature increases, the size of the weight that is required decreases.

It is preferred that the pressure applied during the compaction step be sufficient to compact the magnet powder to a density of at least about 75% of theoretical density, in order to improve the efficiency of sintering and to allow the magnet material to be sintered to adequately high density. A high density of the finished magnet is necessary to achieve adequate energy product. It is preferred that the finished magnet have been sintered to at least 95% of theoretical density, and more preferably, to at least 98% of theoretical density.

In order to obtain a high density of the cold compact, a compaction pressure of about 300 to 1500 MN m$^{-2}$, and preferably about 900 to 1100 MN m$^{-2}$ is employed. The compaction step is typically carried out at room temperature, but may be conducted with similar tooling at temperatures up to about 500° C.

The conditions required for sintering depend on the precise magnet powder employed. In general, such materials may be sintered at a temperature which ranges from about 1150° to 1250° C. At too low a temperature, the diffusion rates are too low to effect sintering; too high a temperature causes the magnet powder to melt, with loss of any magnetic alignment and degradation of magnetic properties of the finished magnet. For $Sm_2Co_{17}$-base materials, it is preferred that the sintering be done at a temperature ranging from about 1190° to 1220° C.

The effectiveness of the sintering step may also be enhanced by the use of a lubricant applied either to the magnet powder or to the sheath. The use of such a lubricant promotes the densification of the powder during the compaction step. Furthermore, during the sintering step, the lubricant promotes sintering by inducing local melting at the surface of the powder particles. This local melting promotes the formation of a metallurgical bond between the magnet powder and the sheath and advantageously reduces the time and temperature required for the sintering step. One lubricant which has been found suitable for this purpose is graphite.

Figure 6:
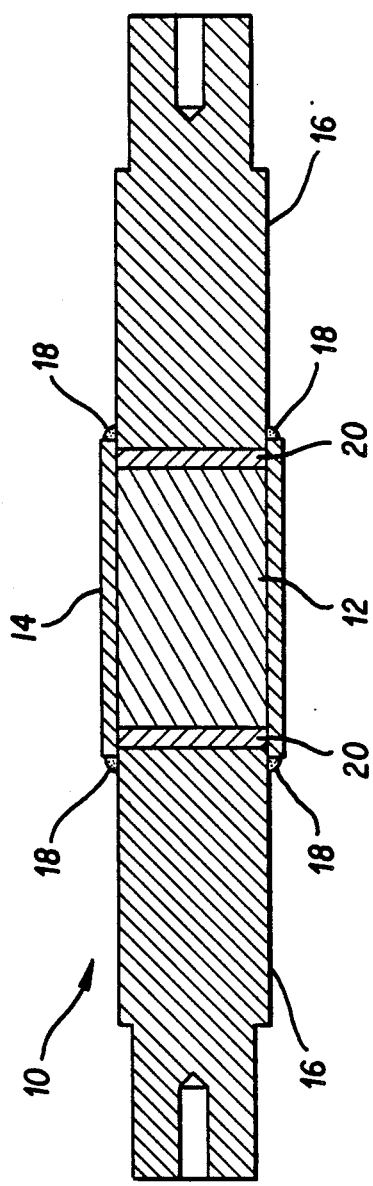
FIG. 6 is a cross-section of an alternative embodiment of the permanent magnet rotor assembly shown in FIG. 1.

In FIG. 6 there is shown in cross section an alternative embodiment of the permanent magnet rotor assembly 10. The rotor assembly 10 is provided with at least one, and preferably a plurality of end plates 20, to which the permanent magnet 12 becomes bonded during the sintering step. Such a bond provides increased strength to the permanent magnet, serving to reduce crack propagation therein and preventing catastrophic fracture thereof during operation. In addition, end plates 20 improve heat flow from the magnet 12 to shaft members 16, protecting against degradation of magnetic properties of magnet 12 during operation. Placement of end plates 20 in position prior to compaction or sintering, encapsulates the magnetic powder, sealing the components of the powder to prevent inadvertent loss thereof during sintering and protecting the sintered magnet against mechanical and environmental damage. Still further, with end plates 20 positioned prior to compaction or sintering, the necessity of machining flat both ends of the sintered permanent magnet 12 is avoided.

The end plates 20 should preferably be made of materials such as those described above as being suitable for the sheath 14. End plates 20 need not be made of the same material as sheath 14; but, in most embodiments would be, so as to minimize problems caused by differential thermal expansion during sintering at high temperatures.

A convenient figure of merit known in the art for permanent magnet materials is the energy product, which is numerically the product of the magnetic field H and the magnetic induction B at the operating point in the second or fourth quadrant of the material's BH loop. The maximum energy product $(BH)_{max}$, measured conveniently in gauss-oersteds (GOe), is a standard way of comparing various magnet materials. Desirable materials have high values of $(BH)_{max}$. Among the known high energy product magnet materials are rare earth-transition metal alloys, including $SmCo_5$-base, $Sm_2Co_{17}$-base, and $Fe_{14}Nd_2B$-base alloys, which have maximum energy products of the order of 15, 25, and 35 megagauss-oersteds (MGOe), respectively.

A variety of rare earth transition metal based magnet powders are believed to be suitable for use in the present invention. Among these are $SmCo_5$, $Sm_2Co_{17}$, and $Fe_{14}Nd_2B$. It is known in the art that various substitutions may be made for the elements in these powders. For example, $Sm_2Co_{17}$ materials frequently contain small amounts of Fe, Zr and Cu. In the $Fe_{14}Nd_2B$ system, the substitution of heavy rare earths, such as Dy, Er, Tb, and Ho, for Nd raises the coercivity, and the substitution of Co for Fe raises the Curie temperature. $Sm_2Co_{17}$-base materials are especially preferred for the applications in which the rotor of the present invention is required to operate at elevated temperatures. $Fe_{14}Nd_2B$ - base materials are preferred for applications in which the highest energy product is desired.

To achieve the best magnetic properties, it is preferred that the rotor assembly be given further heat treatment after the sintering step. The best heat treatment to employ depends upon the particular magnetic material being used. For $Sm_2Co_{17}$-based materials, it is preferred that the heat treatment after sintering comprise a solutionizing treatment, preferably at 1100°–1200° C. for 1–8 hours and an aging treatment, preferably heating to 800° C. and cooling to 400° C. at a rate of about $-1$ to $-5°$ C./min.

It is also preferred that the magnetic powder be aligned prior to, and/or during, the compaction step. Such an alignment improves the energy product of the final magnet by yielding a BH loop that is linear in the second quadrant. The alignment can be done by applying a magnetic field preferably directed perpendicular to the symmetry axis of the rotor assembly. Preferably the magnetic field has a strength at least about 80 kA/m (1 kOe) and more preferably of strength ranging from 80–800 kA/m (1–10 kOe). A high field promotes a greater degree of alignment of the powder particles. The alignment is also enhanced by use of powder having an average particle size ranging from about 3 to 5 μm. Particles of this size are more likely to be composed of a single grain of material than particles of larger size. Application of sufficiently strong magnetic field will urge a single grain of material to turn so that the crystallographic easy axis of magnetization of the grain is parallel to the direction of the applied field. The rotor assembly is remagnetized prior to its intended use by application of a strong magnetic field in the conventional way.

The following examples are presented in order to provide a more complete understanding of the invention. The specific techniques, conditions, materials and reported data set forth to illustrate the invention are exemplary and should not be construed as limiting the scope of the invention.

EXAMPLE 1

A $Sm_2Co_{17}$ rare earth transition metal-based magnet powder having nominal composition $Sm_{25.5}Cu_5Fe_{14}Zr_3Co_{52.5}$ (wt. %) and having an average powder particle size of 25 μm was obtained from Johnson Matthey. About 21 g. of this powder was placed within a cylindrical metal sheath (2.84 cm OD and 1.88 cm ID) of Inconel 718. A piston having diameter 1.87 cm was inserted into the cylinder. The magnet powder was compacted to a density of about 80% of theoretical by applying a force to the piston yielding a pressure of 1000 MN m$^{-2}$. The cold compact thus produced was placed in a vacuum furnace and sintered at 1200° C. for 1 hour. The sample was then solutionized by cooling it from the sintering temperature to a solutionizing temperature of 1150 and holding for a soak time of 1 hour, then cooled at a rate of about 200° C./min to a temperature of 800° C. by admitting argon gas to the furnace and held at 800° C. for 6 hrs.

Figure 3:
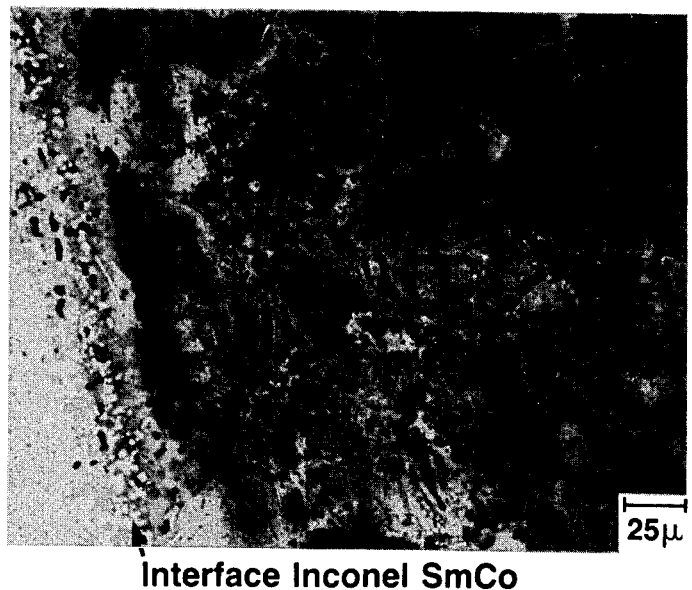
FIG. 3 is optical photomicrograph showing the metallurgical bond.
Figure 4:
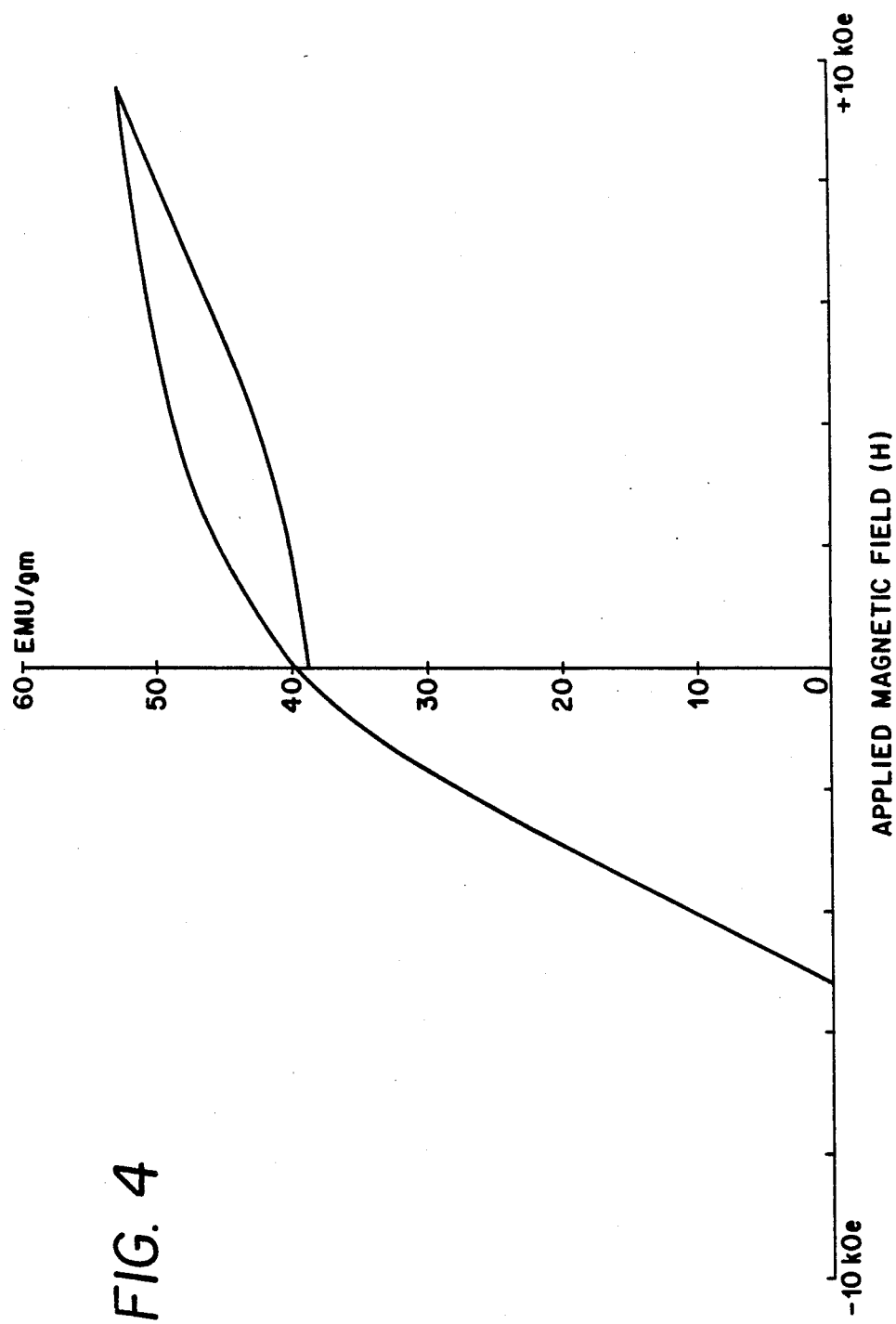
FIGS. 4 and 5 are graphs showing the magnetization of a permanent magnet rotor assembly of the invention as a function of applied magnetic field.

The sample was then given an aging heat treatment by slowly cooling it from 800° C. to 400° C. at a rate of about 1° C.°/min and held at 400° C. for 12 hrs. FIG. 3 is an optical photomicrograph showing a cross-section of this sample, including the interface between the metal sheath and the magnet material. Magnetic properties of the as treated material were obtained by cutting cubes of 3 mm size from the center of the magnet materials. The demagnetizing curve of this material was obtained using a Princeton Applied Research Model 155 vibrating sample magnetometer (VSM). The sample was first exposed to a magnetic field of about 25 kOe along one of the cube axes. The magnetization was then measured as a function of an oppositely directed magnetic field using the VSM, as shown in FIG. 4.

EXAMPLE 2

Figure 5:
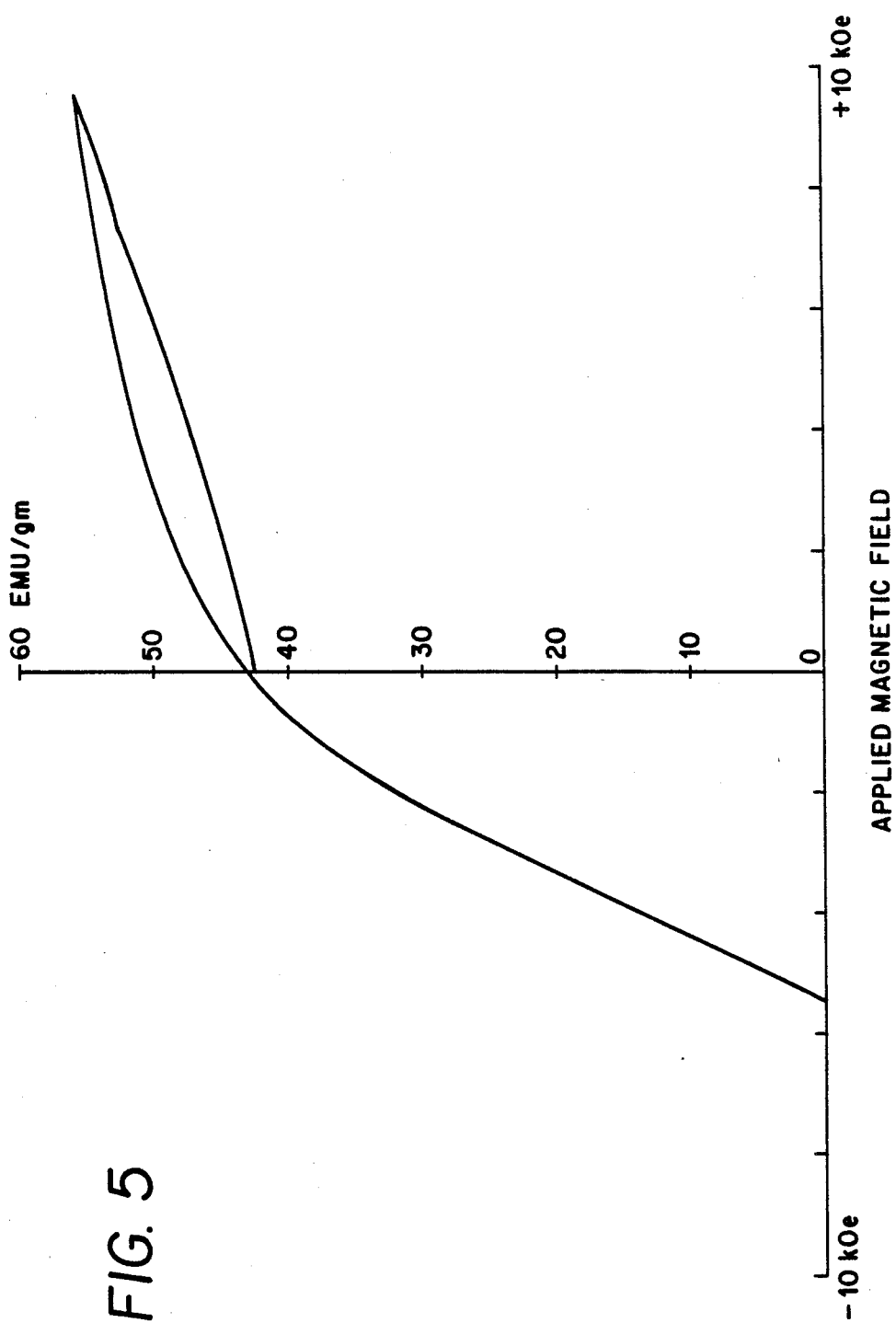

A sample was prepared using the procedure outlined in Example 1, except that a pressure of about 2.92 Kg on 1.9 cm diameter, giving a pressure of 0.10 MN m$^{-2}$, was applied during the sintering step by placing a ceramic disk on top of the compacted magnet powder and the sintering time was 30 minutes. The demagnetizing curve of the sample was obtained as in Example 1, and is shown in FIG. 5. A higher intrinsic coercivity resulted from use of an axial pressure during sintering.

Having thus described the invention in rather full detail, it will be understood that such detail need not be strictly adhered to but that further changes may suggest themselves to one having ordinary skill in the art, all falling within the scope of the invention as defined by the subjoined claims.

What is claimed is:

1. A permanent magnet rotor assembly comprising a sheath, a high energy product permanent magnet contained within said sheath and metallurgically bonded thereto, and at least one shaft member, said shaft member being connected to an end of said sheath and said permanent magnet having been compacted and sintered within said sheath to provide between said permanent magnet and said sheath an interface wherein material from said permanent magnet and said sheath is diffused.

2. A permanent magnet rotor assembly as recited in claim 1, said permanent magnet being cylindrical.

3. A permanent magnet rotor assembly as recited in claim 1, said permanent magnet being composed essentially of a rare earth transition metal alloy.

4. A permanent magnet rotor assembly as recited in claim 3, said rare earth transition metal alloy being composed essentially of at least one member selected from the group consisting of $Sm_2Co_{17}$, $SmCo_5$, and $Fe_{14}Nd_2B$.

5. A permanent magnet rotor assembly as recited in claim 3, said permanent magnet having an energy product of at least 25 MGOe.

6. A permanent magnet rotor assembly as recited in claim 5, said energy product being at least 30 MGOe.

7. A permanent magnet rotor assembly as recited in claim 1, wherein said sheath is a non-magnetic material selected from the group consisting of ceramics and non-magnetic metal alloys.

8. A permanent magnet rotor assembly as recited in claim 1, wherein said permanent magnet has at least one end plate positioned adjacent an end thereof.

* * * * *